United States Patent
Sato et al.

[11] Patent Number: 6,098,514
[45] Date of Patent: *Aug. 8, 2000

[54] ULTRASONIC VIBRATION CUTTER

[75] Inventors: Shigeru Sato; Ryoichi Ishii, both of Fukuoka-ken, Japan

[73] Assignee: Ultex Corporation, Fukuoka-ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/834,993

[22] Filed: Apr. 7, 1997

[30] Foreign Application Priority Data

Apr. 12, 1996 [JP] Japan .................................. 8-91533

[51] Int. Cl.$^7$ ........................................ B26D 1/14
[52] U.S. Cl. ...................... 83/425.3; 83/666; 83/698.41; 83/956
[58] Field of Search ................ 83/701, 956, 698.41, 83/666, 425.3, 425.4, 508.3, 665, 676; 451/165; 125/83, 451, 13.01, 15

[56] References Cited

U.S. PATENT DOCUMENTS

| | | | |
|---|---|---|---|
| 3,081,661 | 3/1963 | MacPherson | ............... 83/698.41 X |
| 3,180,064 | 4/1965 | Ohntrup | ................... 451/165 X |
| 3,471,724 | 10/1969 | Balamuth | ................. 451/165 X |
| 3,750,503 | 8/1973 | McMillan . | |
| 5,226,343 | 7/1993 | Rawson et al. | ............. 83/701 X |
| 5,373,766 | 12/1994 | Ranly et al. | ............ 83/698.41 X |

FOREIGN PATENT DOCUMENTS

| | | |
|---|---|---|
| 0353415 | 2/1990 | European Pat. Off. . |
| 2082090 | 12/1971 | France . |
| 2735412 | 12/1976 | France . |
| 2839098 | 3/1980 | Germany . |
| 60-127968 | 7/1985 | Japan . |
| 02212097 | 8/1990 | Japan . |
| 07132493 | 5/1995 | Japan . |
| 923804 | 5/1982 | U.S.S.R. ................. 83/701 |
| 2282559 | 4/1995 | United Kingdom . |

*Primary Examiner*—Kenneth E. Peterson
*Attorney, Agent, or Firm*—Kanesaka & Takeuchi

[57] ABSTRACT

A disk-shaped cutter extending in a direction perpendicular to the central axis of a resonator is detachably installed on the resonator which is molded substantially cylindrical with a fastening unit.

4 Claims, 2 Drawing Sheets

ULTRASONIC VIBRATION CUTTER

BACKGROUND OF THE INVENTION

1. Field of the Invention

This invention relates to a cutter for cutting a workpiece with ultrasonic vibration.

2. Description of the Prior Art

There has been known an ultrasonic vibration cutter in which a cutter such as a dicing blade, diamond cutter or saw blade is integrally provided in a resonator which resonates with ultrasonic vibration having a predetermined frequency as a tool for cutting a semiconductor chip as a semiconductor element from a wafer for the production of a semiconductor, a metal foil, a printed circuit board or a synthetic resin substrate, However, the ultrasonic vibration cutter of the prior art is uneconomical since only a cutter cannot be exchanged because the cutter is integrally provided in the resonator.

SUMMARY OF THE INVENTION

To cope with this problem, the present invention is aimed to provide an economically advantageous ultrasonic vibration cutter which allows for the exchange of a cutter.

According to a first aspect of the present invention, there is provided an ultrasonic vibration cutter for cutting a workpiece with a cutter installed on a resonator which resonates with ultrasonic vibration having a predetermined frequency. Since the cutter is installed at the minimum amplitude point or in the vicinity thereof, vibration in a cutting direction can be efficiently given to the cutter so that cutting can be carried out efficiently.

Since the resonator has a large diameter portion and a male screw portion projecting coaxially from one end surface of the large diameter portion, the cutter having a cutting blade on a disk-shaped peripheral portion thereof is fitted onto the male screw portion, and a nut is fastened to the male screw portion projecting from this cutter to install the cutter detachably in such a manner that the cutter is located at the minimum vibration amplitude point of the resonator with the nut and the large diameter portion, the cutter can be fixed firmly with the fastening force of the Further, since the cutter is detachably installed with the nut in such a manner that it is located at the minimum vibration amplitude point, the cutter can be exchanged with ease by disconnecting the nut from the male screw portion.

According to a second aspect of the present invention, there is provided an ultrasonic vibration cutter for cutting workpieces with two cutters installed on a resonator which resonates with ultrasonic vibration having a predetermined frequency. Since the two cutters are detachably installed at an equal distance from the minimum vibration amplitude point of the resonator, cutting can be carried out with the two cutters.

Since the two cutters of the same shape are installed with nuts with predetermined spacing therebetween, the cutters can be exchanged with ease by disconnecting the nuts from the male screw portions.

Further, when a plurality of cutters of the same shape are installed with nuts with predetermined spacing therebetween, members having a predetermined width can be cut out from a workpiece.

The above and other objectives, features and advantages of the invention will become more apparent from the following description when taken in conjunction with the accompanying drawings.

BRIEF DESCRIPTION OF THE DRAWINGS

FIG. 1 shows a first embodiment of the present invention, wherein

FIG. 2 shows a second embodiment of the present invention, wherein

DETAILED DESCRIPTION OF THE PREFERRED EMBODIMENTS

Figure 1A:
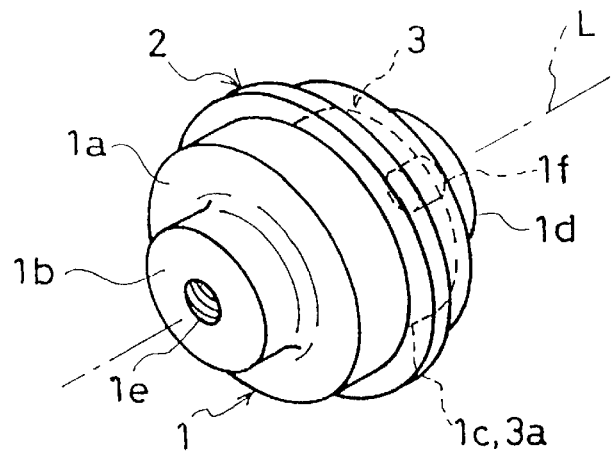
FIG. 1(a) is a perspective view of the outer appearance of the embodiment.
Figure 1B:
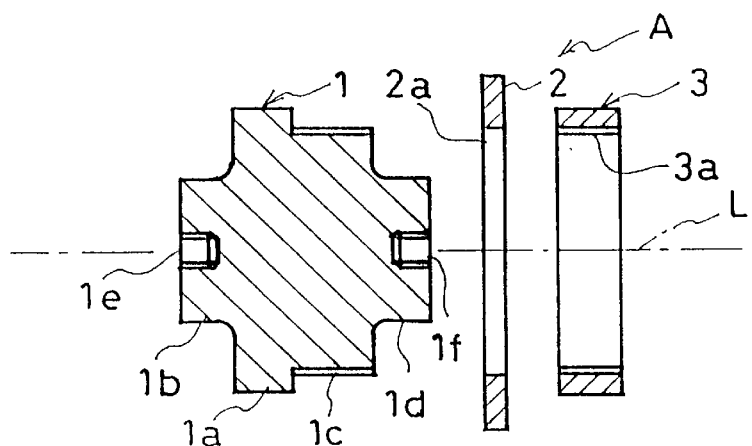
FIG. 1(b) is an exploded sectional view and FIG. 1(c) is a waveform diagram showing relationship with vibration waveform.

FIG. 1 shows a first embodiment of the present invention in which a single diamond cutter 2 which projects in a direction perpendicular to a central axis L is installed by a single nut 3 on a single resonator 1 which is molded substantially cylindrical and has the central axis L. The resonator 1 has a large diameter portion 1a having a smaller diameter than that of the diamond cutter 2, a small diameter portion 1b coaxially provided on one end surface of the large diameter portion 1a, a male screw portion 1c coaxially provided on the other end surface of the large diameter portion 1a and fitted into a through hole 2a of the diamond cutter 2, a small diameter portion 1d coaxially provided on an end surface of the male screw portion 1c, and screw holes 1e and 1f formed in the centers of the end surfaces of the small diameter portions 1b and 1d. A commercial product having a through hole 2a in the center is used as the diamond cutter 2. The nut 3 has a threaded portion 3a to be fitted onto the male screw portion 1b of the resonator 1.

Figure 1C:
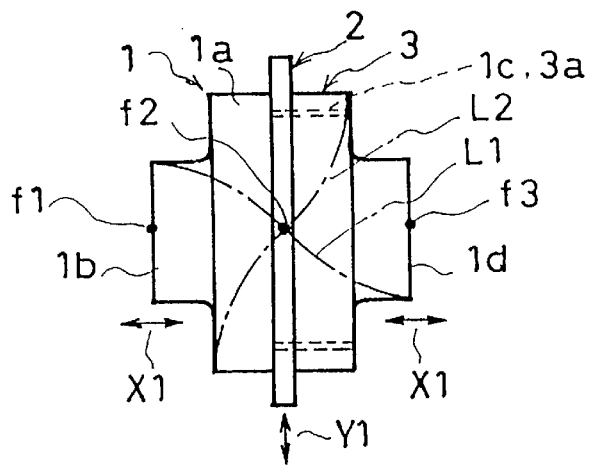

In this embodiment, the through hole 2a of the diamond cutter 2 is fitted onto the male screw portion 1c of the resonator 1, the nut 3 is fitted onto the male screw portion 1c projecting from the through hole 2a, and a fastening tool is fitted into one of tool holes, not shown, formed in the outer peripheral surfaces of the small diameter portions 1b and 1d of the resonator 1 to fasten the nut 3 firmly by rotating it in a fastening direction, whereby the single diamond cutter 2 is brought into close contact with the large diameter portion 1a of the resonator 1 in such a manner that it is coaxially sandwiched between the large diameter portion 1a and the nut 3 and an outer peripheral portion of the diamond cutter 2 which is a cutting blade having diamond powders adhered thereto projects outward from the resonator 1. In this assembled ultrasonic vibration cutter, the output end of a transducer which is an electro-acoustic or electro-vibration transducer formed of a piezoelectric element or magnetostrictive element for converting into mechanical energy electric energy which is output by generating vertical ultrasonic vibration having a predetermined frequency with power supplied from an unshown ultrasonic generator is coaxially connected to the small diameter portion 1b of the resonator 1 with the screw hole 1e in the resonator 1, an unshown screw hole formed in the output end of the transducer and unshown headless screws to be screwed into these screw holes. This resonator 1 is formed like a rod from super steel such as SKD11 or the like and hardened in a vacuum atmosphere, or is formed like a rod from a sintered metal. The resonator 1 is an ultrasonic horn itself which applies ultrasonic vibration transmitted from the unshown transducer connected thereto to the diamond cutter 2 and has a length equal to half the wavelength from the maximum vibration amplitude point f1 to the maximum vibration amplitude point f3 as shown in FIG. 1(c) while the diamond cutter 2 is installed on the resonator 1 in such a manner that it is sandwiched between the resonator 1 and the nut 3 when the resonator 1 is seen from the transducer. The minimum amplitude point f2 is located at an intermediate position of the thickness of the diamond cutter 2 attached to the resonator 1. In this case, the large diameter portion 1a and the male screw portion 1c of the resonator 1 and the nut 3 constitute the fastening unit A of the present invention.

According to the structure of this embodiment, since the diamond cutter 2 is sandwiched between the resonator 1 and the nut 3, the diamond cutter 2 can be exchanged with ease by fitting the fastening tool into the above unshown tool hole formed in the resonator 1 and rotating the nut in a loosening direction. Therefore, this embodiment is economically advantageous.

The unshown transducer is connected to one end of this assembled ultrasonic vibration cutter and then this assembly is attached to a holding portion of an ultrasonic vibration cutting machine with one side or both sides thereof supported by the holding portion so that it is rotated driven by an unshown motor or rotated along with the horizontal movement of the holder. When the resonator 1 is resonated with vertical ultrasonic vibration by supplying power to the transducer, as shown in FIG. 1(c), vibrations indicated by virtual lines L1 and L2 which cross each other at a right angle at the minimum amplitude point f2 and resonate with each other are generated alternately in the resonator 1, portions located at the maximum vibration amplitude points f1 and f3 of the resonator 1 vibrate in a direction shown by an arrow X1 in FIG. 1(c), and the cutting blade of the diamond cutter 2 located at the minimum vibration amplitude point f2 vibrates in a direction shown by an arrow Y1 in FIG. 1(c) which is perpendicular to the direction shown by the arrow X1. The outer peripheral portion of the diamond cutter 2 is brought into contact with a portion to be cut of a workpiece such as a wafer, metal foil, printed circuit board or synthetic resin substrate by the above rotation driven by the motor or rotation along with the horizontal movement of the holder to cut a semiconductor chip as a semiconductor element from a wafer, metal foil, printed circuit board or synthetic resin substrate.

Figure 2A:
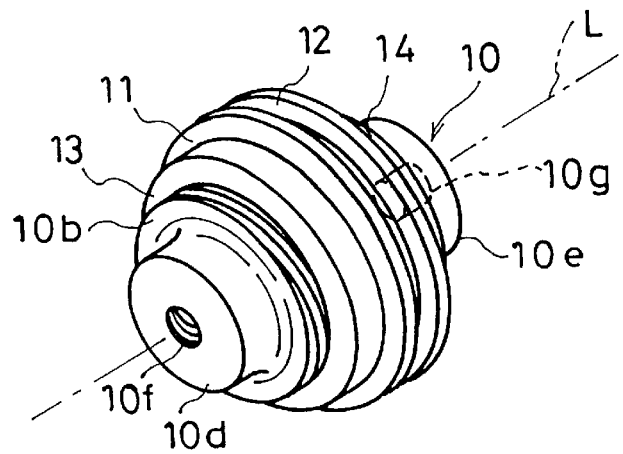
FIG. 2(a) is a perspective view of the router appearance of the embodiment.
Figure 2B:
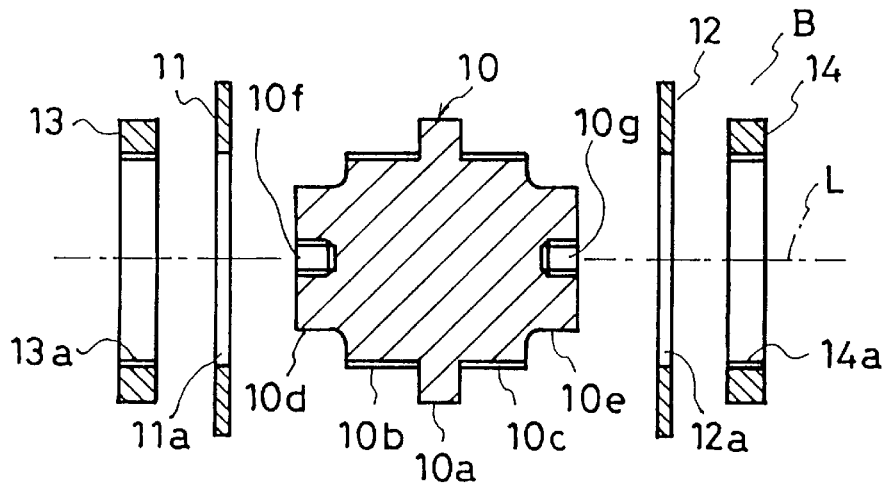
FIG. 2(b) is an exploded sectional view and FIG. 2(c) is a waveform diagram showing relationship with vibration waveform.

FIG. 2 shows a second embodiment of the present invention. Two diamond cutters 11 and 12 of the same shape which project in a direction perpendicular to the central axis L are installed on the outer peripheral surface of a single resonator 10 formed substantially cylindrical and having the central axis L with two nuts 13 and 14 in such a manner that there is predetermined spacing between the cutters 11 and 12. The resonator 10 has a large diameter portion 10a having a smaller diameter than those of the diamond cutters 11 and 12, male screw portions 10b and 10c to be fitted into through holes 11a and 12a formed in the diamond cutters 11 and 12 and coaxially provided on both end surfaces of the large diameter portion 10, small diameter portions 10d and 10e coaxially provided on the end surfaces of the male screw portions 1ob and 10c, and screw holes 10f and 10g formed in the centers of the end surfaces of the small diameter portions 10d and 10e, respectively. Commercial products having through holes 11a and 12a in the centers thereof are used as the diamond cutters 11 and 12. The nuts 13 and 14 have threaded portions 13a and 14a to be fitted onto the male screw portions 10b and 10c of the resonator 10, respectively.

Figure 2C:
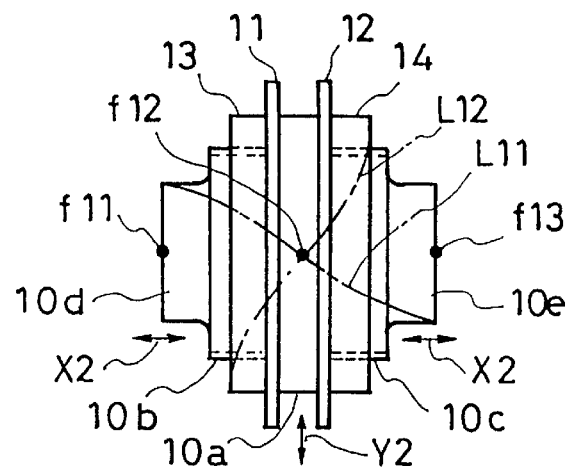

In this embodiment, the through hole 11a of the diamond cutter 11 is fitted onto the male screw portion 10b of the resonator 10, the nut 13 is fitted onto the male screw portion 10b projecting from the through hole 11a, and a fastening tool is fitted into a tool hole, not shown, formed in the outer peripheral surface of the small diameter portion 10d of the resonator 10 to fasten the nut 13 firmly by rotating it in a fastening direction. Meanwhile, the through hole 12a of the diamond cutter 12 is fitted onto the male screw portion 10c of the resonator 10, the nut 14 is fitted onto the male screw portion 10c projecting from the through hole 12a, and a fastening tool is fitted into a tool hole, not shown, formed in the outer peripheral surface of the small diameter portion 10e of the resonator 10 to fasten the nut 14 firmly by rotating it in a fastening direction. Thereby, the two diamond cutters 11 and 12 are brought into close contact with the large diameter portion 10a of the resonator 10 in such a manner that they are coaxially sandwiched between the large diameter portion 10a and the nuts 13 and 14, respectively, with predetermined spacing therebetween which is the thickness of the large diameter portion 10a and outer peripheral portions of the diamond cutters 11 and 12 which are cutting blades having diamond powders adhered thereto project outward from the resonator 10. In this assembled ultrasonic vibration cutter, the output end of a transducer which is an electro-acoustic or electro-vibration transducer formed of a piezoelectric element or magnetostrictive element for converting into mechanical energy electric energy which is output by generating vertical ultrasonic vibration having a predetermined frequency with power supplied from the unshown ultrasonic generator is coaxially connected to the small diameter portion 10d of the resonator 10 with the screw hole 10f in the resonator 10, an unshown screw hole formed in the output end of the transducer and unshown headless screws to be screwed into these screw holes. This resonator 10 is formed like a rod from super steel such as SKD11 or the like and hardened in a vacuum atmosphere, or is formed like a rod from a sintered metal. The resonator 10 is an ultrasonic horn itself which applies ultrasonic vibration transmitted from the unshown transducer connected thereto to the diamond cutters 11 and 12. While the diamond cutters 11 and 12 are installed on the resonator 10 in such a manner that they are sandwiched between the resonator 10 and the nuts 13 and 14, respectively, when the resonator 10 is seen from the transducer, as shown in FIG. 2(c), vibrations indicated by virtual lines L11 and L12 which cross each other at a right angle at the minimum vibration amplitude point f12 and resonate with each other are generated alternately in the resonator 10, the resonator 10 has a length half the wavelength from the maximum vibration amplitude point f11 to the maximum vibration amplitude point f13, the minimum amplitude point f12 is located at an intermediate position of the thickness of the large diameter portion 10a of the resonator 10, and the two diamond cutters 11 and 12 are located on both sides of the minimum vibration amplitude point f12 at an equal distance therefrom. In this case, the large diameter portion 10a and the male screw portions 10b and 10c of the resonator 10 and the nuts 13 and 14 constitute the fastening unit B of the present invention.

According to the structure of this embodiment, since the two diamond cutters 11 and 12 are installed on the resonator 10 with the nuts 13 and 14, a fastening tool is inserted into one or both of the unshown tool holes formed in the outer peripheral surfaces of the small diameter portions 10d and 10e of the resonator 10 and the nuts 13 and 14 are rotated in a loosening direction to exchange the diamond cutters 11 and 12 with ease. Therefore, it is economically advantageous.

The unshown transducer is connected to one end of this assembled ultrasonic vibration cutter and then this assembly is attached to a holding portion of an ultrasonic vibration cutting machine with one side or both sides thereof supported by the holding portion so that it is rotated driven by an unshown motor or rotated along with the horizontal movement of the holder. When the resonator 10 is resonated with vertical ultrasonic vibration by supplying power to the transducer, as shown in FIG. 2(c), portions located at the maximum vibration amplitude points f11 and f13 of the resonator 10 vibrate in a direction shown by an arrow X2 in FIG. 2(c), and the cutting blades of the diamond cutters 11 and 12 located in the vicinity of the minimum vibration amplitude point f12 vibrate in a direction shown by an arrow Y2 in FIG. 2(c) which is perpendicular to the direction shown by the arrow X2. The outer peripheral portions of the diamond cutters 11 and 12 are brought into contact with portions to be cut of a workpiece such as a wafer, metal foil, printed circuit board or synthetic resin substrate by the above rotation driven by the motor or rotation along with the horizontal movement of the holder to cut a semiconductor chip as a semiconductor element from a wafer, metal foil, printed circuit board or synthetic resin substrate to a predetermined width.

In this second embodiment, cutting to a width other than the predetermined width as in the first embodiment is possible using the cutter 11, for example. In this case, when the material of a workpiece is soft like a synthetic resin with a small vibration amplitude, cutting may be carried out by removing the other cutter 12 and installing the nut 14. However, when the material of a workpiece is hard like a wafer or a metal foil with a large vibration amplitude, the vibration amplitude must be well balanced using an unshown dummy cutter having substantially the same mass as that of the cutter 12 in place of the cutter 12. The diameter of the dummy cutter is made smaller than that of the cutter 11 used for cutting to prevent the dummy cutter from contacting the workpiece while the cutter 11 cuts the workpiece in contact with the workpiece with the result that a cutting operation can be performed properly.

In the first and second embodiments, when the vibration amplitude is large, it is recommended to reduce the thicknesses in a radial direction of the nuts 3, 13 and 14, namely, the thicknesses between the threaded portions 3a, 13a and 14a and the outer peripheral surfaces thereof so as to reduce a vibration energy loss. In this case, when the outer diameters of the nuts 3, 13 and 14 are made substantially equal to the outer diameters of the large diameter portions 1a and 10a of the resonators 1 and 10 and the outer diameters of the male screw portions 1c, 10b and 10c of the resonators 1 and 10 and the inner diameters of the threaded portions 3a, 13a and 14a of the nuts 3, 13 and 14 are made large to reduce the thicknesses in a radial direction of the nuts 3, 13 and 14, the vibration amplitude is well balanced.

In the first and second embodiments, when the fastening directions of the nuts 3, 13 and 14 are set to a fastening direction with respect to the rotation directions of the cutters 2, 11 and 12 during a cutting operation, the nuts 3, 13 and 14 can be prevented from being loosened during a cutting operation.

In FIGS. 1 and 2, the cutting blades of the diamond cutters 2, 11 and 12 are simply illustrated to have a rectangular section. It is the most common that these cutting blades are actually formed to have a wedge-shaped section.

If a dicing blade or saw blade other than the diamond cutters 2, 11 and 12 is used as a cutter according to the material of a workpiece, the same function and effect as those of the above embodiments can be obtained.

A plurality of structures in which two cutters are installed on both sides of the large diameter portion 10a of the resonator 10 with the nuts 13 and 14 may be provided on the outer peripheral surface of the resonator 10 as a matter of course. Alternatively, a plurality of structures in which one cutter is installed on one side of the large diameter portion 1a of the resonator 1 with the nut 3 may be provided on the outer peripheral surface of the resonator 1 as a matter of course.

What is claimed is:

1. An ultrasonic vibration cutting device comprising:

a resonator (1) which resonates with an ultrasonic vibration having a predetermined frequency and which has a plurality of small diameter portions (1b, 1d), a large diameter portion (1a) and a male screw portion (1c), wherein said portions are formed as a single body of said resonator and arranged in a sequence of one of said small diameter portions, said large diameter portion, said male screw portion and another of said small diameter portions in a state of a straight line in an axial direction from an end of said resonator to another end of the same, at least one of said small diameter portions has a screw connecting means (1e, 1f) at a center of its end surface for coaxially connecting a mating member, which is to be connected with said resonator, and said male screw portion is located at a position including a minimum vibration amplitude point (f2) of said vibration in an axial direction of said resonator and has a diameter smaller than that of said larger diameter portion but larger than that of said small diameter portions;

cutting means (2) of disk shape for cutting workpiece, said cutting means having a central through-hole (2a) fitted over said male screw portion with contact and a periphery working as an annular cutting blade and having a diameter larger than that of said larger diameter portion;

nut means (3) for detachably securing said cutting means to said resonator, said nut means having an external shape identical with that of said large diameter portion, wherein said large diameter portion, cutting blade of said cutting means, nut means, and male screw portion are subjected to a vibration mode converted to a radial direction which is perpendicular to said axial direction of said resonator at said minimum vibration amplitude point in said axial direction, under the condition that said cutting means is sandwiched between said large diameter portion and said nut means which is secured to said male screw portion after said cutting means is fitted over said male screw portion.

2. An ultrasonic vibration cutting device according to claim 1, wherein said screw connecting means is a threaded hole.

3. An ultrasonic vibration cutting device comprising:

a resonator (10) which resonates with an ultrasonic vibration having a predetermined frequency and which has a plurality of small diameter portions (10d, 10e), a large diameter portion (10a) and a plurality of male screw portions (10b, 10c), wherein said portions are formed as a single body of said resonator and arranged in a sequence of one of said small diameter portions, one of said male screw portions, said large diameter portion, another of said male screw portions and another of said small diameter portions in a state of a straight line in an axial direction from an end of said resonator to another end of the same, at least one of said small diameter portions has a screw connecting means (10f, 10g) at a center of its end surface for coaxially connecting a mating member, which is to be connected with said resonator, said large diameter portion is located at a position of a minimum vibration amplitude point (f12, a modal point) of said vibration in an axial direction of said resonator, and said male screw portions have a diameter smaller than that of said larger diameter portion but larger than that of said small diameter portions;

a plurality of cutting means (11, 12) of disk shape for cutting workpiece, each of said cutting means having a central through-hole (11a, 12a) fitted over said male screw portion with contact and a periphery working as an annular cutting blade and having a diameter larger than that of said larger diameter portion;

a plurality of nut means (13, 14) for detachably securing said cutting means to said resonator, each of said nut means having an external shape identical with that of said large diameter portion, wherein said plurality of cutting means are placed with equidistance with respect to said minimum vibration amplitude point of said vibration in said axial direction of said resonator by said large diameter portion, and said large diameter portion, cutting blades of said cutting means, nut means, and male screw portions are subjected to a vibration mode converted to a radial direction which is perpendicular to said axial direction of said resonator at said minimum vibration amplitude point in said axial direction, under the condition that said cutting means are sandwiched between said large diameter portion and said nut means which are secured to said male screw portions after said cutting means are fitted over said male screw portions.

4. An ultrasonic vibration cutting device according to claim 3, wherein said screw connecting means is a threaded hole.

* * * * *